S. Lord,
Spoke Lathe.
№ 18,207. Patented Sep. 15, 1857.
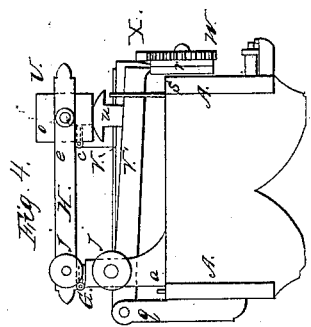
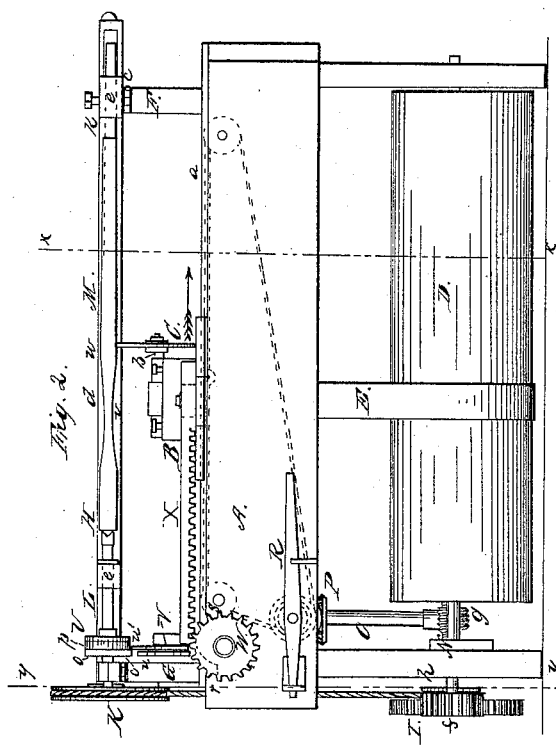
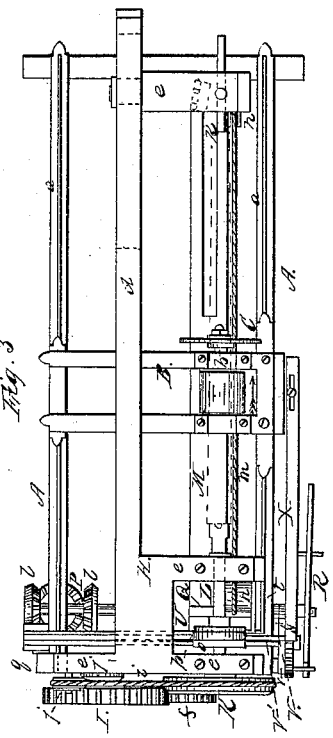
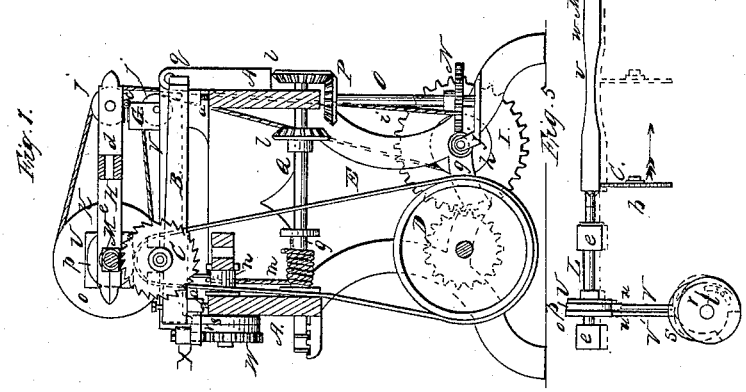

UNITED STATES PATENT OFFICE.

SAMUEL LORD, OF PERRY, GEORGIA.

SPOKE-MACHINE.

Specification of Letters Patent No. 18,207, dated September 15, 1857.

*To all whom it may concern:*

Be it known that I, SAML. LORD, of Perry, in the county of Houston and State of Georgia, have invented a new and Improved Machine for Cutting or Turning Spokes for Wheels; and I do hereby declare that the following is a full, clear, and exact description of the same, reference being had to the annexed drawings, making a part of this specification, in which—

Figure 1, is a transverse vertical section of my improvement taken in the line $(x)$ $(x)$ Fig. 2. Fig. 2, is a side view of ditto. Fig. 3, is a plan or top view of ditto. Fig. 4, is a vertical transverse section of the vibrating frame and bed of the lathe taken in the line $(y)$ $(y)$ Fig. 2. Fig. 5, is a detached view of the mechanism by which the desired configuration or form is given the spoke.

Similar letters of reference indicate corresponding parts in the several figures.

My invention consists in centering the stuff which is to be cut or turned, in a vibrating frame the axis of which has an oblique position relatively with the stuff, and employing in connection with said frame thus hung a novel means for operating the frame, and also employing a traveling saw, the whole being arranged as will be hereinafter fully shown and described whereby spokes of the usual or proper form may be turned or cut, direct from the stuff at one operation.

To enable those skilled in the art to fully understand and construct my invention I will proceed to describe it.

A, A, represent two parallel beams or bars on the upper surfaces of which guides $(a)$ are placed.

B is a carriage which is fitted on said guides, the carriage having an arbor $(b)$ placed on it.

C is a circular saw attached to one end of the arbor $(b)$. The arbor $(b)$ is placed transversely on the carriage B, as shown plainly in Figs. 2 and 3. The beams or bars A, A, are supported at a suitable height by any proper framing, and a drum D is placed at the lower part of the framing. Around the drum D a belt E passes, said belt also passing around the pulley on the saw arbor, see Figs. 1 and 2.

F, G, are two uprights which are placed on the beams A, A', at opposite ends, and H is a horizontal frame which is hinged to the upper ends of the uprights F, G, as shown at $(c)$ $(c)$. The frame H it will be seen by referring to Fig. 3, is formed merely of a longitudinal bar $(d)$ having side projections $(e)$ attached to it at right angles and its axis of vibration, shown in red is in an oblique position relatively with its bar $(d)$.

To one of the journals of the drum D a pinion $(f)$ is attached. This pinion gears into a toothed wheel I which is placed on the outer end of a shaft J having a screw $(g)$ on its inner end. The shaft J also has a pulley $(h)$ on it adjoining the wheel I and this pulley has a belt $(i)$ passing around it, said belt also passing around a pulley K on a mandrel L in the frame H, and around guide pulleys $(j)$ $(j)$. Between the inner end of the mandrel L and a center $(k)$ at the opposite end of the frame H, the stuff M is centered, shown in red in Fig. 3. This stuff is got out of proper dimensions and is centered between its points precisely the same as articles are centered in an ordinary lathe.

The screw $(g)$ on the shaft J, gears into a toothed wheel N which is placed at the lower end of a vertical shaft O which is attached to the framing of the machine. On the upper end of the shaft O a bevel wheel P is secured. Q, is a sliding shaft which passes transversely through the bars or beams A, A'. This shaft has two bevel pinions $(l)$ $(l)$ placed on it, and either of said pinions may be made to gear into the pinion P on shaft O, by operating a lever R which is connected to one end of said shaft. On the shaft Q a drum S is placed, around which a cord or chain $(m)$ is wound several times. This cord also passes around pulleys $(n)$ $(n)$ at opposite sides of the beam or bar A', and is attached to the under sides of the carriage B. On the mandrel L a hub or boss V is placed. This hub or boss is formed of a square or quadrilateral portion $(o)$ and an elliptical portion $(p)$ placed side by side.

V, V', represent levers which are pivoted at one end to an upright $(q)$ attached to one of the beams A. The opposite ends of these levers rest upon cams $(r)$ $(s)$ which are attached to the inner side of a toothed wheel W, which is placed at the outer side of the beam A'. A rack X which is attached to the carriage B gears into the toothed wheel W. The cam $(r)$ is permanently attached to the toothed wheel W, but the cam (s) is adjustable and may be turned on the axis of the wheel W so as to be placed relatively in varying positions with the cam (r) as may be desired, the cam (s) being screwed to the cam (r) by a set screw (t). The outer end of the lever V rests or bears upon the periphery of the cam (s) and the lever V', rests or bears upon the periphery of the cam (r).

The operation is as follows. The stuff M is centered in the frame H and the carriage B is so adjusted that the saw C will be at the butt end of the spoke or the end which is dogged to the mandrel L. Motion is then given the drum D in any proper manner. This drum rotates the saw C by means of the belt E, and also gives a slow traveling movement to the carriage B in the direction indicated by arrow 1, see Figs. 1 and 3. This movement of the carriage is obtained through the medium of the screw (g) wheel N shaft Q and cord (m) arranged as shown. The rack X as the carriage B moves rotates the wheel W. The stuff M is also rotated in the frame H by means of the cord or belt (i). The square portion (o) of the hub or boss V rests on a vertical plate (u) attached to lever V', and the lever V' rests on the most prominent portion of cam (s). As the stuff M rotates, the frame H is vibrated in consequence of the square portion (o) resting upon the plate (m) on the lever V', and the butt of the spoke will be cut in square form, the butt gradually tapering to the point (v). The lever V' now rests when the most depressed part of the cam (s) and the cam (r) commences to raise the lever V so that its plate (u') will bear against the elliptical portion (p) of the hub or boss U, and thus the elliptical portion will then vibrate the frame H and as said portion (p) is gradually raised by the cam (r) the form of the spoke transversely gradually increases to the point (W). The motion of the wheel W and cams (r) (s) then stops as the rack X leaves the wheel and a gradual elliptical taper is given the spoke from the point (u) to its end, the taper being given in consequence of the frame H having its axis of vibration in a diagonal or oblique position relatively with the stuff M, and the elliptical form being given in consequence of the frame being vibrated by the elliptical portion (p) of the hub or boss U. The stuff is completed as the saw travels along; a spoke being cut or turned at each stroke or movement of the carriage B. The carriage B is gigged back by operating the lever R so as to reverse the movement of shaft Q.

I do not claim separately and apart from the arrangement herein shown any of the parts herein described; but,

I claim as new and desire to secure by Letters Patent—

The vibrating frame H, operated as shown and arranged with the carriage B and saw C, specifically as described so as to operate conjointly as and for the purpose set forth.

SAMUEL LORD.

Witnesses:
CHARLES H. HEYWOOD,
DAVID KING.